Figure 1:
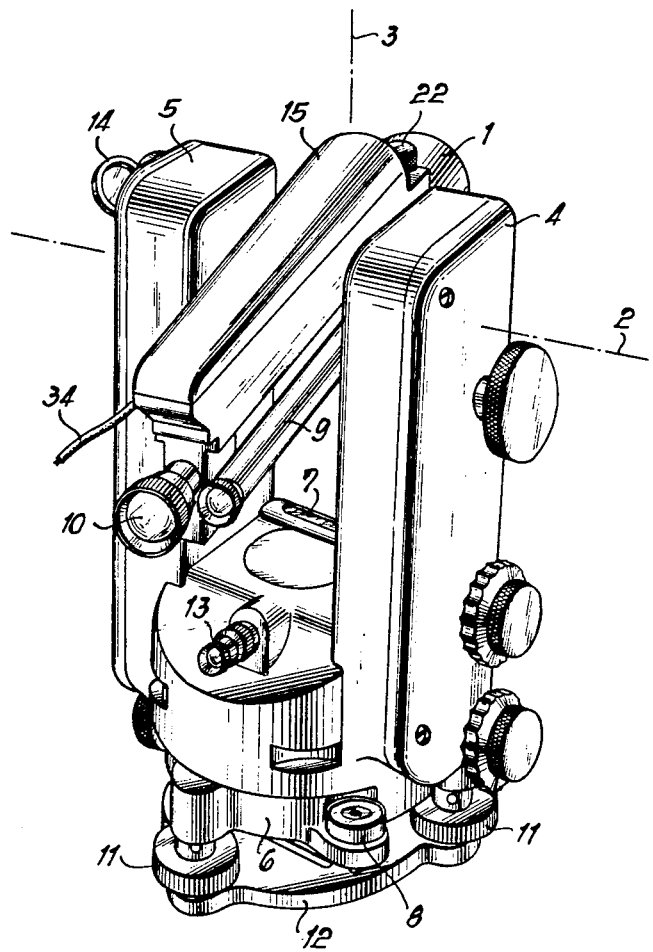

July 24, 1962

M. BIERMANN ETAL 3,046,404

METHOD OF AND MEANS FOR COMPARISON OF TWO ELECTRICAL
POTENTIALS FOR PURPOSES OF PHOTOMETRY AND THE LIKE

Filed May 8, 1959

8 Sheets-Sheet 1

INVENTORS
Markus Biermann
Christoph Kuehne

By: Samuel W. Kipnis
Att'y.

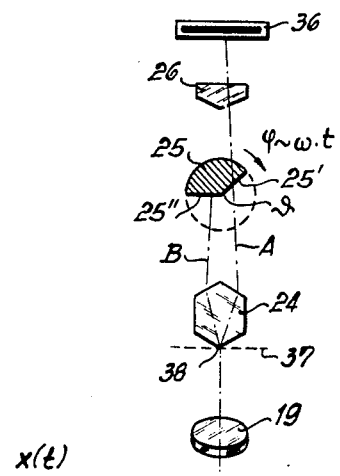
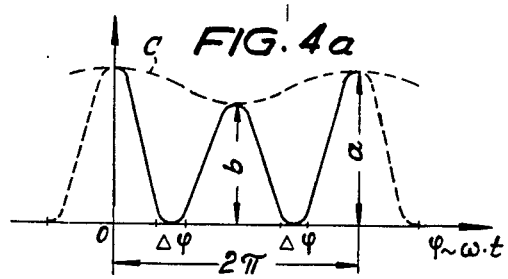
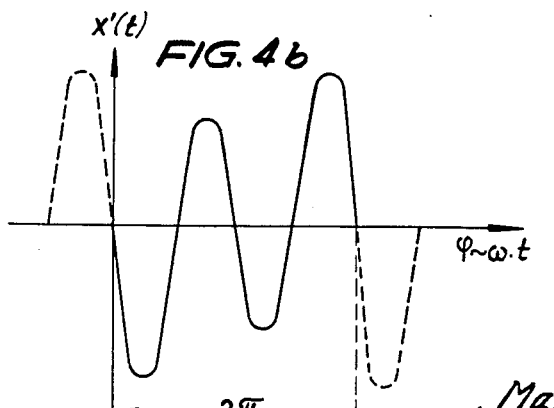

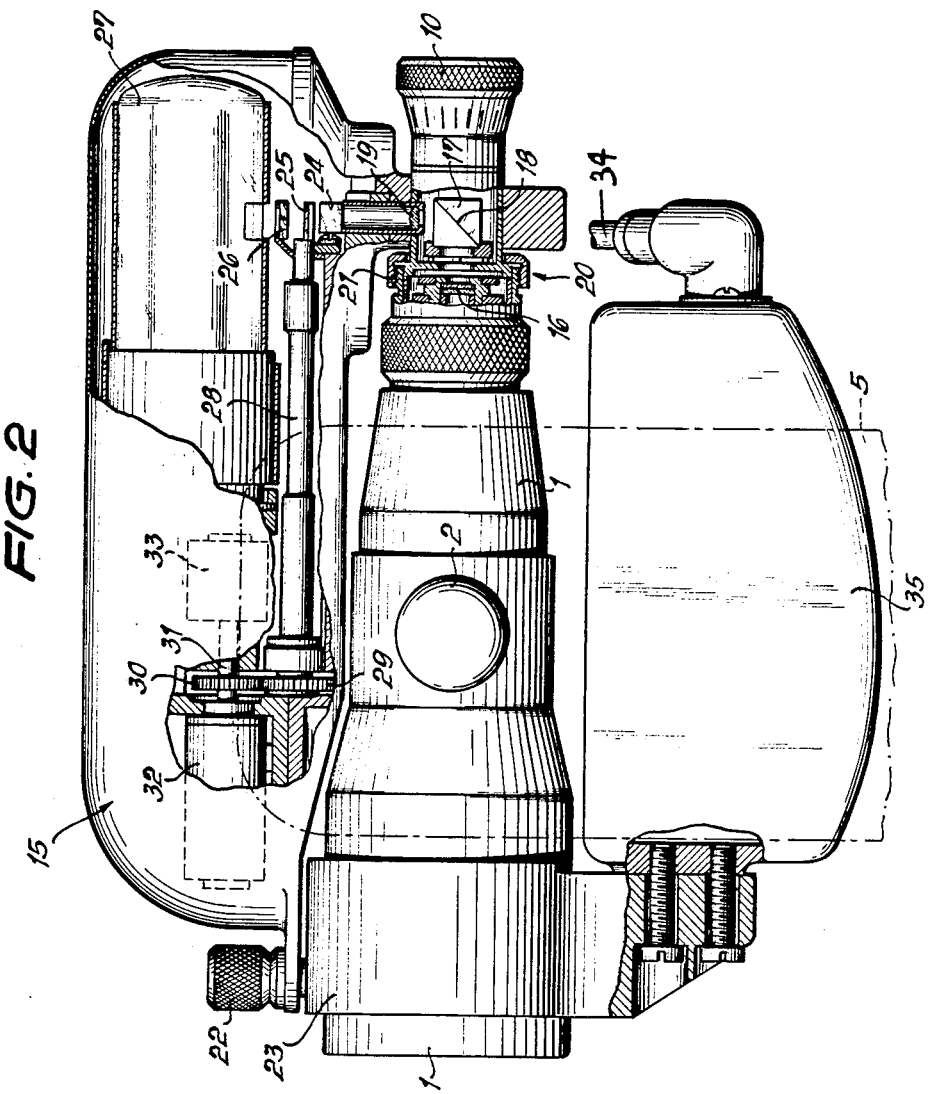

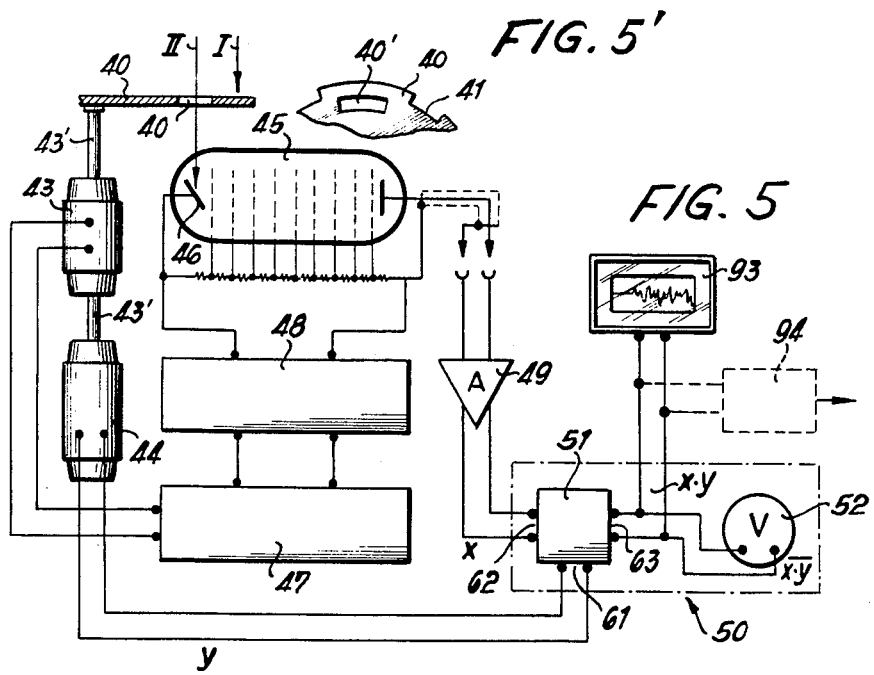
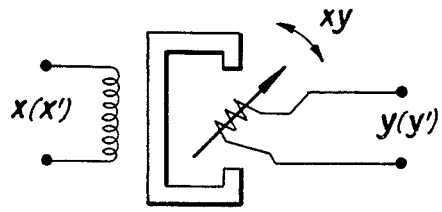
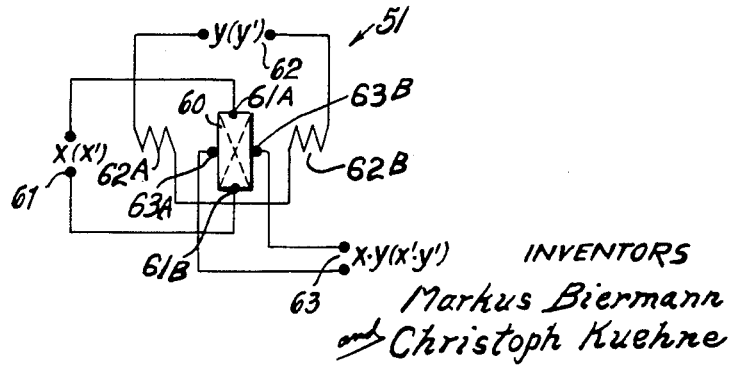

INVENTORS
Markus Biermann
Christoph Kuehne

BY Samuel W. Kipnis
Att'y.

INVENTORS
Markus Biermann
Christoph Kuehne

BY: Samuel W. Kipnis
Atty.

INVENTORS
Markus Biermann
and Christoph Kuehne

By: Samuel W. Kipnis
Atty.

United States Patent Office 3,046,404
Patented July 24, 1962

3,046,404
METHOD OF AND MEANS FOR COMPARISON OF TWO ELECTRICAL POTENTIALS FOR PURPOSES OF PHOTOMETRY AND THE LIKE
Markus Biermann, Berlin-Halensee, and Christoph Kuehne, Berlin-Zehlendorf, Germany, assignors to Askania-Werke A.G., Berlin-Friedenau, Germany, a corporation of Germany
Filed May 8, 1959, Ser. No. 811,966
Claims priority, application Germany May 16, 1958
21 Claims. (Cl. 250—203)

This invention relates to a measuring method for comparing two electrical potentials and to means for carrying out the method. The invention has to do particularly with the comparison of light fluxes in so-called objective or radiometric photometers and the like.

Many objective photometers are known which are provided with a photo-electric transducer, cyclically exposed to two light fluxes to be compared, by suitable mechanical controls. Such a transducer furnishes electrical potentials corresponding in magnitude to the light fluxes, which potentials are then to be compared as to their amplitudes. In case of light flux disparity the sequence of potentials generated by the transducer includes potential impulses in direct alternation or in some other cycle or series-type sequence.

Devices are known which allow comparison of such cyclic potentials, and thereby comparison of the light fluxes, by systems including electronic switches in the output of the transducer, said switches being used to feed the successive potentials representing the respective light fluxes, in proper phase, separately, through a pair of circuit channels separate from one another, to a single electrical device for measuring the difference or quotient of such potentials, and for thereby forming a directly readable comparison of said potentials. In comparison with earlier arrangements known to the art, such a system has certain advantages, in that it prevents measuring errors previously caused by the use of a pair of photosensitive transducers, the behavior of which was not exactly the same.

The present invention provides further improvements of such a system. Improvement has been found to be possible when it was found that difficulties are associated with the use of switching means as indicated, whether mechanical or electronic; the behavior of the two switching channels leading to the measuring instrument cannot be controlled sufficiently. Elements of such channels, including both electrical and electronic elements, are subject to temporal drifts of parameters, whereby errors are added to the potential to be measured.

In one group of the known systems the electronic part of the photometer has been built in the form of a discriminator circuit, receiving the cycle of measuring potentials generated by the transducer and also receiving reference potentials of basically constant amplitude. In the output of such a discriminator, zero potential occurs in case of equality of the light fluxes and of the corresponding potentials, averaged over a certain period. Such circuits usually include electron tubes or rectifiers having more than two electrodes, such tubes or rectifiers being disposed in bridge circuits the branches of which are controlled in opposite phase by the reference potentials. Thus the potentials to be compared, or values derived therefrom, reach the discriminator output sequentially and through separate branches of the bridge; and again errors are caused by differential aging or behavior of the separate multielectrode elements.

According to the invention the drawbacks of the known systems are largely avoided by means of such comparison of cyclic potentials as is characterized in that a multiplying mixer stage directly furnishes a product of the cyclic potentials to be measured and of an electrical alternating potential which occurs subject to a fixed phase difference relative to the potentials to be measured, a temporal average value of the potential being measured.

By means of this characterising feature it has become possible largely to avoid the errors caused by nonsymmetrical behavior, that is, by different behavior or aging of electronic elements and the like in separate channels or bridge portions.

According to a preferred form of the invention a single transducer is combined with a single multiplying mixer unit. More particularly it has been found to be advantageous to use a mixer which employs at least one magnetic alternating field for the mixing process.

The direct formation of the product of measuring potentials $x(t)$ and reference potentials $y(t)$ is important. Other procedures would be possible and have been tried to some extent, but have been found incapable of furnishing such precision as is available by the new method. For instance it would be possible in a known process to derive the value $(x+y)^2 - (x\pm y)^2 = 4xy$. Such a process, however, differs unfavorably from that of the invention in that it requires separate channels for forming the difference $(x-y)$ and the sum $(x+y)$; and such separate channels, for instance resistors, introduce errors, as has been explained.

Figure 5A:
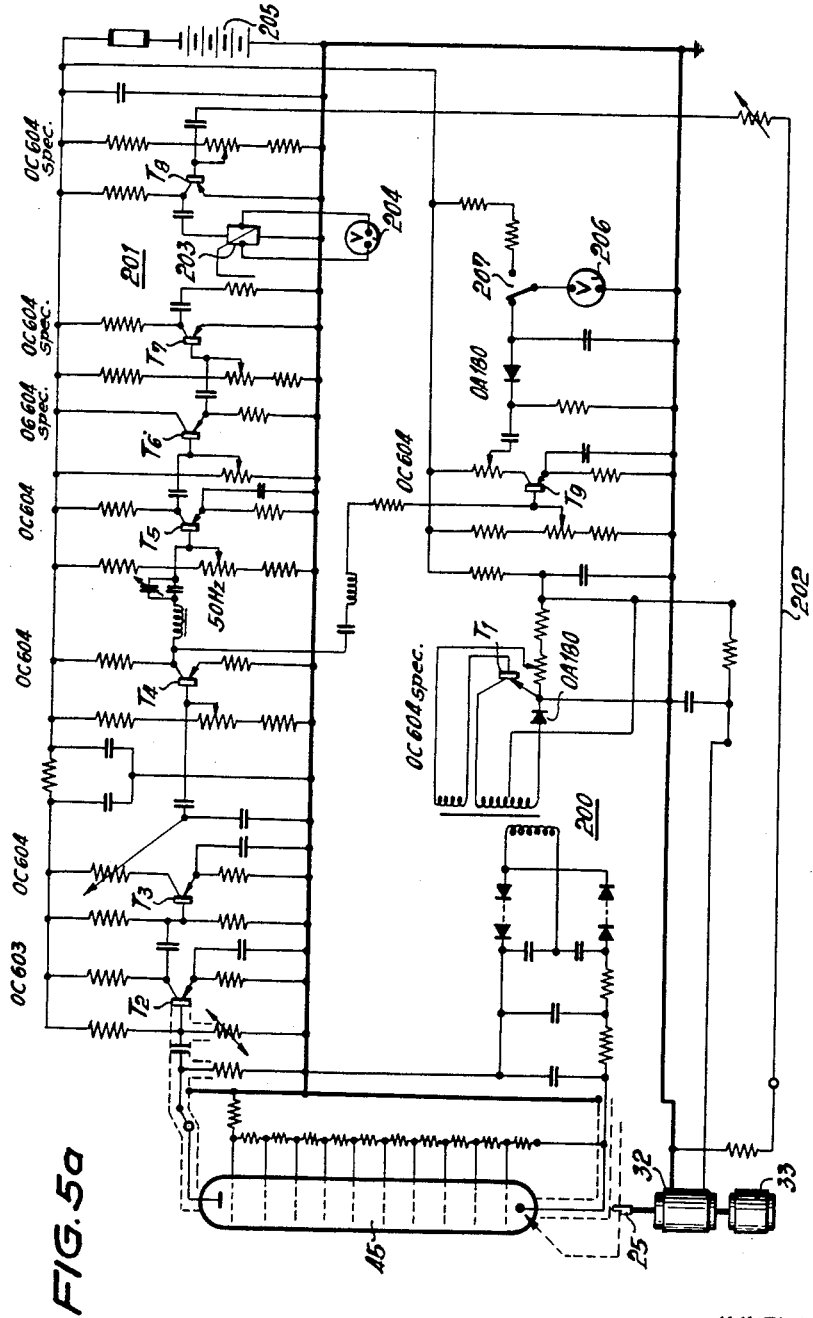
Figure 8:
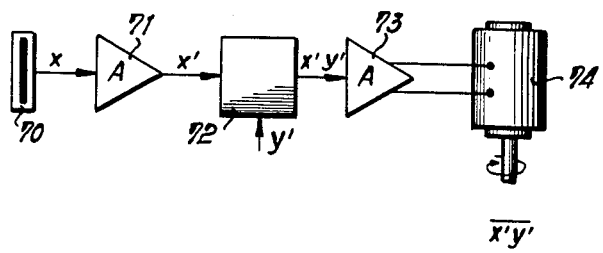

In the drawing appended hereto several systems according to the invention are shown, thereby explaining also the method according to the invention. FIGURE 1 is a perspective front view of a photoelectrically governed or indicating theodolite. FIGURE 2 is a fragmentary section and elevation, showing principal parts of said theodolite in a plane defined by telescope 1 and axis 3 in FIGURE 1. FIGURE 3 is a schematic view of optical elements from FIGURE 2. FIGURES 4a and 4b are graphs of output values furnished by a transducer element of FIGURE 3. FIGURE 5 is a block diagram of circuitry for the transducer element of FIGURE 3 (a mechanical part of the transducer being shown in slightly modified form). FIGURE 5' is a plan view of the modified transducer part of FIGURE 5, showing a detail thereof. FIGURE 5a is a more complete circuit diagram for the transducer. FIGURE 6 is a detail diagram showing the multiplying mixer of FIGURES 5 and 5a. FIGURE 7 shows a modified mixer detail. FIGURE 8 is a slightly more detailed diagram of a regulator portion of FIGURES 5 and 5a.

Figure 9:
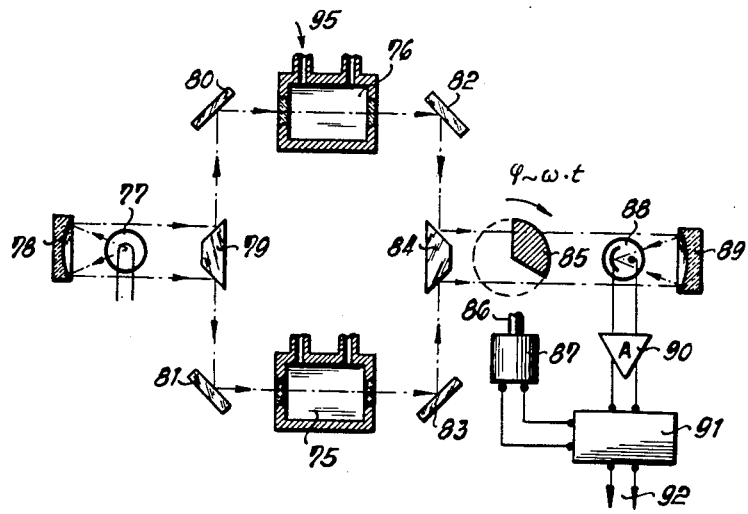
Figure 8A:
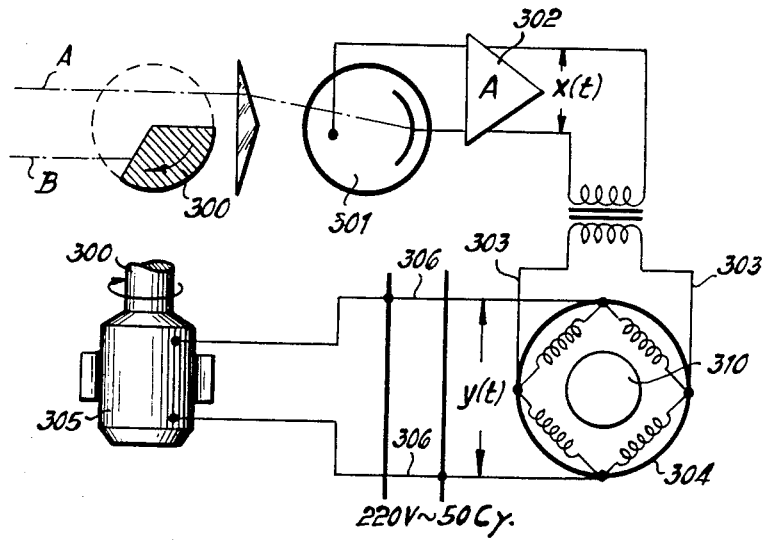
Figure 8B:
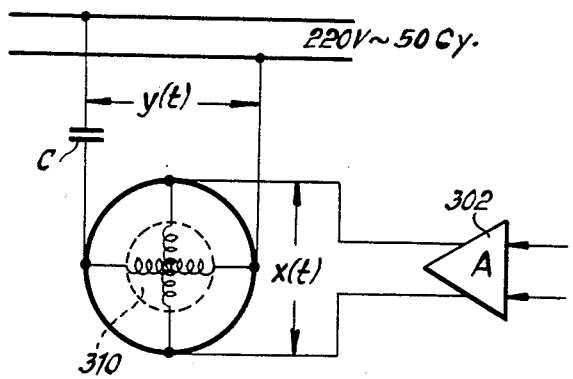
Figure 10:
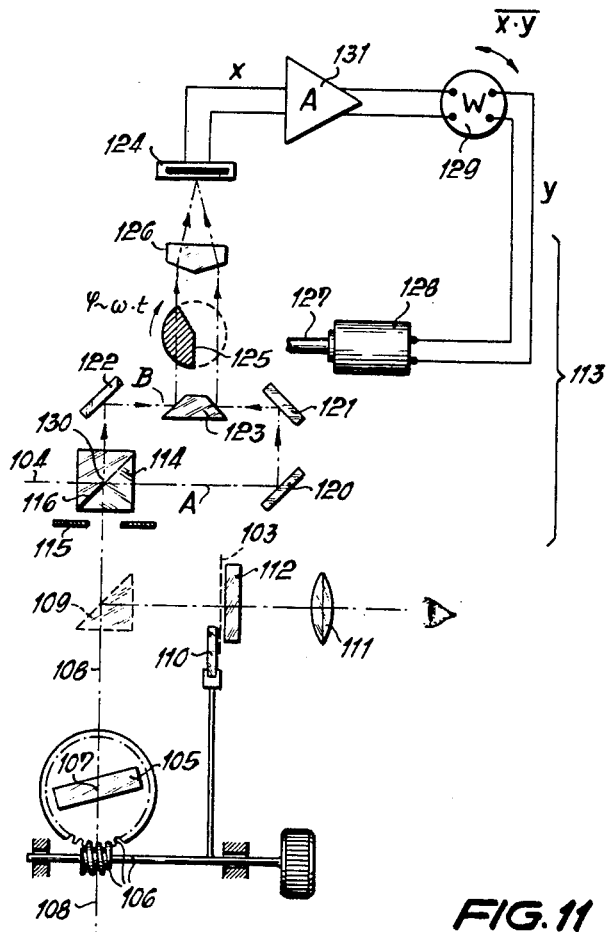
Figure 11:
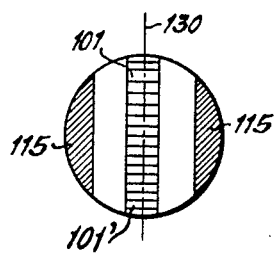

FIGURES 8a and 8b are more detailed diagrams of circuit portions similar to those of FIGURES 7 and 8. FIGURES 9 and 10 are schematic views and block diagrams similar to those of FIGURES 3 and 5 but showing the invention applied to purposes other than those of the photoelectric theodolite. FIGURE 11 is a schematic view of a detail from FIGURE 10.

Reference will first be made to the basic objects of a theodolite as shown. Such a device serves to direct a telescope to a target with an accuracy higher than that obtainable by human observation aided by optical means. It is generally desired that the telescope be pointed with angular precision down to fractions of a second of an arc. The device is therefore called a second theodolite. See FIGURE 1.

Telescope 1 of this instrument is swingable about horizontal axis 2 in frame members 4, 5 which are rotatable about vertical axis 3 on base plate 6, exact levelling being checked by spirit levels 7, 8. A microscope 9 serves to read vertical and horizontal circles of the theodolite, not shown, while the target is visible in ocular 10. Tripod screws 11 of the instrument rest on a lower base plate 12; an optical plumb bob or equivalent device can be observed at 13; and illumination of circles etc. is provided by a mirror 14. According to the invention the theodolite is provided with photoelectric transducer-mixer means 15.

The transducer arrangement is basically shown in FIGURE 2. Reticle 16 of telescope 1 is followed by a glass cube 17 diagonally split by plane 18 coated with an interference mirror coating for spectral splitting of the intermediate image formed at 16, one portion thereof being passed to ocular 10 and another to transducer objective 19. Transducer unit 15 is a housing which extends parallel to and above telescope 1 and which is secured to ocular end 20 by coupling 21 and to the objective end of the telescope by clamp 23.

As indicated by FIGURES 2 and 3, an image is formed by objective 19 in the plane 37 of an edge 38 of image splitter prism 24 and the partial images so formed are cyclically admitted by revolving shutter 25 and collector prism 26 to one and the same point on the photocathode 36 of a secondary electron multiplier tube 27. Shutter 25 is rotated by shaft 28, driven by gearing 29, 30 on output shaft 31 of D.C. motor 32. This motor also drives generator 33 of the alternating reference potential $y(t)$ utilized in accordance with the invention. A simple generator 33 may furnish sinusoidal reference potentials by rotating a permanent magnet, not shown, relative to a yoke with a coil thereon. The angular velocity $\omega$ of revolving shutter 25 thus equals the cycling velocity of the reference potential.

Shutter 25 is advantageously formed as a cylinder sector having boundary planes 25', 25'' which include an angle $\vartheta$ such that during one revolution of the shutter, the two light fluxes A and B, formed by prism 24 and to be compared by tube 27, are withheld from said tube over a certain angle $\Delta\varphi$, between alternating exposures during the cycle.

In FIGURE 4a, time is plotted horizontally and intervals corresponding to said angle $\Delta\varphi$ are clearly shown. Vertically plotted are the potentials $x(t)$ furnished by tube 27, and it has been assumed that potentials $a$ corresponding to light fluxes A are greater than potentials $b$ corresponding to light fluxes B. The solid line curve shows the potentials furnished during one cycle $2\pi$ of system 25, 33. The illustrated condition $a>b$ means that telescope 1 is not accurately pointed to the target. In order to correct such pointing the elescope must be moved until the signal becomes $a=b$.

The measuring potential $x(t)$, which varies in time and which is represented by said solid line curve, can be considered as a sequence of impulses derived from light pulses A, B separated as shown, or from unseparated or more or less overlapping light pulses. In either case it will be found on consideration of $x(t)$ for one cycle that an alternating potential component C is contained therein, the phase of which depends on the ratio $a:b$. If $b<a$, the phase of C is as shown. If $b>a$, the sign of said phase is reversed. The fundamental frequency of C equals that of system 25, 33. This is independent of the detailed shape of pulses A, B, which shape depends on the geometry of the optical control mechanism.

As it is often necessary to amplify the signal output of tube 27, a differentiating effect is often caused by RC members of the amplifier, thereby modifying the signal of FIGURE 4a into that of FIGURE 4b. This is still an amplitude modulated signal. For the further explanations, which follows, the measuring potentials $x(t)$ can be analysed as follows.

(1) $\quad x=(1+\cos 2\varphi)(1+m \cos \varphi)$ where $0 \leq \varphi \leq 2\pi$ and $\varphi \sim \omega t$ and where factors of no essential significance for the amplitude have been suppressed, while $(a-b):(a+b)$ has been expressed as $m$. Differentiation yields:

(2) $\quad x'=\dfrac{dx}{d\varphi}=-2 \sin 2\varphi \left(1+\dfrac{3}{2}m \cos \varphi\right)$ Equations 1 and 2 yield the Fourier series (1a) $\quad x=1+\dfrac{3}{2}m \cos \varphi+\cos 2\varphi+\dfrac{3}{2}m \cos 3\varphi+\ldots$ (2a) $\quad x'=\dfrac{3}{2}m \sin \varphi-2 \sin 2\varphi-\dfrac{9}{2}m \sin 3\varphi-\ldots$ According to the invention this $x$ or $x'$ is multiplicatively mixed with a cyclic alternating value having fixed and predetermined phase difference relative thereto. Let it be assumed for the present analysis that such value or reference oscillation is a square wave or the first differential quotient thereof, as follows:

(3) $\quad y=\cos(\varphi+\Delta\varphi)+\frac{1}{3}\cos 3(\varphi+\Delta\varphi)\ldots$ (3a) $\quad y'=-\sin(\varphi+\Delta\varphi)-\sin 3(\varphi+\Delta\varphi)\ldots$ In Equations 3 and 3a harmonics have been considered only up to the third order. $\Delta\varphi$ means deviations of 0 or $\pi$ between phase of $y$, $y'$ and that of $x$, $x'$.

If there is now formed the product $xy$ or $x'y'$ and the time average thereof the D.C. component of the product is found as (4) $\quad \overline{xy}=\dfrac{1}{T}\int_0^\pi x(\varphi)y(\varphi)d(\varphi)=m \cos \Delta\varphi$ (4a) $\quad \overline{x'y'}=\dfrac{1}{T}\int_0^\pi x'(\varphi)y'(\varphi)d\varphi=3m \cos \Delta\varphi$ Thus it appears that the time average of the product of measuring potential and reference value depends only on value $m$ and the phase difference of the two potentials. It must however be presupposed for this purpose that, if $x$ contains even harmonics of the fundamental, $y$ contains only odd harmonics of the fundamental. The D.C. component of the product is zero when $a=b$.

It will be seen from the foregoing illustrative explanation of the process, which in principle provides a harmonic analysis of the measuring signal, that the amplitudes of the two signals $a$, $b$, shown in FIGURE 4a, can thus be compared, it being possible not only to determine their equality but also to measure, with proper sign, deviations from difference zero.

The reference potential, as already mentioned, can provide a sinusoidal wave. In many cases, however, it is more convenient to utilize for instance the square wave which has also been mentioned above. For this purpose generator 33 of FIGURE 2 may for instance constitute a known square wave generator, not shown. Care must generally be taken that reference potential $y$, $y'$ contains no even harmonics of alternating component C since the mode of cycling of the measuring potentials is often beyond control. No difficulty arises from possible variations of revolving velocity of system 25, 33. As may be seen from Equations (4), (4a) the measuring process becomes less sensitive when the phase difference $\Delta\varphi$ between measuring and reference potentials $x$, $y$ is not 0 or $\pi$. However, no measuring error occurs even if $\Delta\varphi$ varies.

Apparatus for carrying out the so explained process is shown in FIGURE 5, wherein the optical equipment is schematically represented by a system including a revolving shutter plate 40 having suitable apertures 40' and 41 for two light fluxes, here identified as I and II; also see FIGURE 5'. Multiplier and photocathode are here shown as 45, 46 and the shutter motor, shaft and reference generator as 43, 43', 44. A current source 47, such as a battery, serves to actuate motor 43 and also to furnish, through D.C. voltage transducer 48, power for the electrodes of multiplier 45. The output of this multiplier is amplified at 49 before it is fed to mixing system 50, where it is multiplied, in mixer 51, with the reference value from generator 44. Instrument 52 measures the D.C. component $xy$ of the product formed in mixer 51. The phase of reference signal $y$ is adjustable by suitably shifting the rotatable parts of generator 44 relative to the stationary parts thereof.

Attention is drawn to the absence of any plurality of separate signal channels or bridge circuit branches from 46 to 52.

FIGURE 6 shows a preferred multiplicative mixer 51 in form of a so-called Hall generator, that is, a rectangular, conductive or semiconductive body 60, through which current flows longitudinally. On application of a magnetic field with flux lines normal to the direction of the current a potential is created between the longitudinal sides of the body by the so-called Hall effect, which follows the equation $$U_H = R_H \frac{BI}{d}$$

wherein $U_H$ is the Hall voltage; $R_H$ is the so-called Hall constant of the material used in body 60; B is the magnetic induction; I is the current; and $d$ is the thickness of the body 60. Since $R_H$ and $d$ in effect are constants, the Hall generator multiplies B and I. Body 60 can suitably be formed of so-called semiconductors consisting of compounds of elements of the III and V group of the periodic system, for instance, indium-antimony and indium-arsenic compounds (InSb, InAs), which have exceptionally high carrier mobility at room temperature.

FIGURE 6 shows Hall crystal 60 schematically with coils 62A, 62B which create the magnetic field by means of reference potential $y,y'$ impressed on terminals 62, while terminals 61, 61A, 61B have the measuring voltage impressed thereon. Lateral or so-called Hall electrodes 63A, 63B, connected to output terminals 63, furnish the product $xy$, directly. Alternatively, as shown in FIGURE 5, the arrangements 61, 62 can be reversed. Coils 62A, 62B are desirably provided with laminated cores when using low frequencies, or with ferrite cores or ferrite-binder cores when using higher frequencies. Low resistances are involved in the galvanic and magnetic systems of the Hall generator and the output system 63A, 63B is not galvanically insulated from the control system 61A, 61B. In order to minimize the measuring error, the Hall voltage must be measured by an instrument 52 of high impedance. If, on the other hand, it is only desired to determine the disappearance of the D.C. component of $xy$ the instrument can have impedance characteristics similar to those of the Hall crystal, amplification being suitably employed.

Hall generator crystals are often subject to error caused by lack of accurate symmetry of the Hall electrodes 63A, 63B relative to the semiconductor 60 and/or lack of complete homogeneity of the crystal. Such error, however, does not affect the performance of the mixer according to the present invention if one of the oscillations to be multiplied has no D.C. component, as can be arranged without difficulty. Accordingly, thermoelectrically produced potentials represent the only significant source of error. Such potentials are caused by inequality of temperatures, which inequality can however be avoided by the use of good heat conductors, for instance as magnet coils.

In the device of FIGURE 2, transducer 48 (FIGURE 5) is disposed in housing 35, secured to the underside of telescope 1 by fastening means on clamp 23. Thus it is necessary only to connect the telescope-transducer unit 1, 15, 35 with a remote instrument cabinet by a cable 34, containing the low-voltage conductors connecting current source 47 with voltage transducer 48 (FIGURE 5) and connecting photo-electric transducer 45 with amplifier-mixer instrument unit 49, 50.

Details of the electric circuitry may be found in FIGURE 5a. Power for electron multiplier 45 is provided by blocking oscillator circuit 200 including transistor $T_1$ and furnishing for instance a 100 cycle frequency if motor 32 is mechanically controlled to run at 50 cycles. The 100 cycle output of tube 45 is amplified by amplifier 201 (transistors $T_2$, $T_3$, $T_4$) while the 50 cycle component is amplified by a selective last stage of said amplifier (transistors $T_5$, $T_6$, $T_7$). A 50 cycle frequency is also fed, by conductor 202, from generator 33 to transistor $T_8$ which interconnects amplifier 201 with the mixer element or Hall generator, here shown at 203; the measuring device for measuring the Hall voltage being shown in this diagram at 204.

The above-described circuitry is powered by battery 205, the voltage of which can be observed and/or controlled by instrument 206, suitably connected with the circuitry at 207. A 100 cycle amplifier (transistor $T_9$) serves to control the degree of amplification of that part of amplifier 201 which does not selectively amplify. The output voltage of this amplifier can also be controlled at 206, on suitable setting of switch 207.

According to a modified aspect of the invention, multiplication of the two alternating voltages is achieved by a dynamometric measuring instrument of the multiple coil type, resembling a watt meter and wherein the average product, for a given period of time, is represented by the position of a pointer. Such an instrument can be built so as to provide even greater accuracy than is available by means of Hall generators.

FIGURE 7 shows the basic arrangement of measuring voltage input $x$, reference voltage input $y$ and kinetic output $xy$ of such an instrument. As in the case of a Hall type mixer, the output is independent of the frequency of alternation, it being assumed of course that frequencies are high enough to avoid disturbance of the position of the movable coil. It is also necessary, as in the Hall type instrument, that the reference oscillation be free of even harmonics and that no D.C. component be used except (at most) in one of the two coils, preferably in that receiving measuring voltage $x$.

The measuring method of the invention may be employed for purposes of regulation or control as well as for indication and the like. It may be employed for instance for the purpose of keeping an astronomical or other telescope, such as that of FIGURE 1, trained on a star or other target, by connecting the electrical unit with a servomotor. FIGURE 8 shows such a system. The photocathode and multiplier are here shown at 70; the amplifier thereof at 71; the multiplying mixer at 72; a further amplifier at 73 and the servomotor at 74.

The method can also be used for a variety of systems wherein values are to be compared. FIGURE 9 shows an embodiment of the invention providing an analytical photometer. A light source 77 generates monochromatic light which passes via reflector 78, beam splitter prism 79 and reflectors 80, 81 into and through receptacles 75, 76 containing respectively a reference medium and a substance to be analyzed. The light fluxes from the two receptacles are then passed via reflectors 82, 83, beam combining prism 84, revolving shutter 85, and reflector 89 to light sensitive element 88, the shutter being operated as in FIGURE 2. The signal output of element 88 is amplified in 90 and is then mixed in 91 with a reference signal generated by device 87 driven by shaft 86 of shutter 85. Output terminals 92 of the mixer may be connected with a measuring instrument 52 as in FIGURE 5 and/or with a recorder 93, as well as with a regulator 94, for instance to vary passage of a suitable fluid into receptacle 76, at 95 (FIGURE 9) until equality of light absorption has been established, by corresponding variation of the signal at 92, as explained above.

FIGURE 10 shows a further embodiment of the invention, wherein light fluxes are compared for the precision reading of a graduated circle, scale or the like. Graduations 101 of the circle or scale are illuminated from below and are imaged by lens 102 in image planes 103, 104, the light being passed through optical micrometer 105 which consists of a plane-parallel glass plate rotatable by mechanism 106 about axis 107 to shift the graduation image while avoiding angular motion of raytrace 108. Semi-reflecting prism 109 is interposed on said raytrace.

Mechanism 106 has a glass plate 110 coupled therewith to show, by a scale thereon, the position of micrometer plate 105, in micrometer ocular 111, adjacent reticle 112 which carries a reading index. System 110, 112, containing image plane 103 as shown, serves to allow approximate, human observation of graduation mark 101 relative to the index.

More precise observation φs provided by means of photometric device 113, which includes an image splitter 114, combined with aperture member 115, at image plane 104. The limiting edge 130 of a reflector coating 116 on the diagonal plane of prism 114 serves as separating element of the image splitter, light stream A being reflected by coating 116 and light stream B being transmitted by the uncoated part of the prism. The two light streams pass via reflectors 120, 121 and 122, respectively, to prism 123, shutter 125, collector prism 126 and photocathode 124. Shaft 127 of shutter 125 also rotates reference signal generator 128. Signals from 124 and 128 are mixed in wattmeter 129, after amplification of the first mentioned signal at 131.

FIGURE 11 is an enlarged representation of the image formed in plane 104. If and when micrometer 105 has been adjusted properly and if and when a graduation mark 101 has been positioned precisely on raytrace 108 (FIGURE 10), image 101' of said mark is exactly centered on edge 130 and between the edges of aperture member 115 (FIGURE 11) and light fluxes A, B are then of equal strength, thereby furnishing a zero reading at 129 (FIGURE 10).

Modification is also possible with respect to the use of Hall generators or wattmeter instruments as mixers. For instance, multiplicative mixing of cyclic electric signals can be obtained according to FIGURE 8a, 8b, by means of single phase or polyphase induction motors (Ferraris motors). Light streams A, B, for instance from a system such as that of FIGURE 3, are passed across a revolving shutter which is here shown at 300 and then through the collector prism into photocell 301. The cycle of measuring voltages in the output of cell 301, amplified in 302, is applied to the control winding 303 of an induction (Ferraris) motor 304. Line voltage is impressed on a synchronous motor 305 for rotating shutter 300, and also impressed on the exciting winding 306 of motor 304. The shaft 310 of motor 304 is coupled directly or by gearing to the shaft of a slave motor (controlled Ferraris motor), not shown, for regulation of the telescope drive so as to keep light fluxes A, B equal. In this way the telescope is kept trained on the target, in one plane; and similar action is provided in a second plane by a similar set of devices.

The measuring and reference voltages are impressed on motor 304 with 90° phase difference. The motor may be of well known type, with non-magnetic rotor for instance of aluminum, disposed in the airgap of the stator and exposed to a rotating field the direction and strength of which are proportional to the measuring voltages. Multiplication of measuring and reference voltages is performed by means of the rotating field, no contribution to said field being made by those components of the measuring voltage cycle which do not have the same frequency as the reference voltage cycle, and which accordingly do no useful work. In the diagram of FIGURE 8a ring 304 indicates the motor in general and also the stator thereof, which is a magnet wound with a continuous and symmetrical coil. Voltages $x(t)$ and $y(t)$ are applied to pairs of points on said coil in the manner of a bridge circuit.

A different motor circuit, which can also be used for purposes hereof, is shown in FIGURE 8b. In this case the induction (Ferraris) motor has a two phase stator winding, one phase being connected to line across condenser C while the other is connected to measuring voltage amplifier 302, both phases being galvanically separate.

Each embodiment allows comparison of amplitudes of signals derived from two light fluxes or the like by a pure one-channel process and without asymmetry. It may further be noted that the process can be used with a great variety of signal cycles, for instance, not only with a cycle A, B, A, B as in FIGURE 4a, but also with other cycles such as A, B, B; A, B, B (with reference cycle corresponding to the frequency A . . . A . . . A etc.). The reference frequency, which in this latter case is one-third of the measuring pulse frequency, is thus independent of the exact measuring pulse and dependent only on the intermittence frequency of the measuring pulse. It may finally be added that the process is independent from the use of either broad-band or selective amplification of signals. Assuming for instance that the pulse frequency is very high and/or the noise-signal ratio is unfavorable, the amplifier can be arranged so as to favor the intermittence frequency. Assuming on the other hand that the pulse frequency is very low it may be desirable to superimpose thereover a periodic intensity modulation of underlying light signals or the like, whereby the process is in no way impaired but on the contrary the actual cycle response may be crispened. A variety of other modifications may be applied.

We claim:

1. A method of comparing amplitudes of two electrical voltage maxima of fixed phase in a periodic voltage signal, comprising the steps of feeding the entire signal to a mixing stage through a single channel; feeding to said stage a reference voltage cycle of the same frequency and in fixed phase relation to the signal; multiplicatively mixing said signal and reference voltage in said stage; and measuring the time average of the product.

2. A method as described in claim 1 wherein the reference voltage cycle includes a fundamental frequency and only odd harmonics of said fundamental frequency.

3. A method as described in claim 1 wherein said phase difference is zero or $\pi$.

4. Apparatus for comparing two quantities comprising means responsive to said quantities to vary the amplitudes of two electrical voltage maxima of fixed phase in a periodic voltage signal, a mixing stage having the same voltage and current paths for all portions of the signal, means for feeding a reference voltage cycle to said stage in fixed phase relationship to said signal and means in said stage for multiplying the signal and reference voltages.

5. Apparatus as described in claim 4 additionally including means for adjusting the fixed phase relationship.

6. Apparatus as described in claim 4 wherein the mixing stage comprises a dynamometrical measuring instrument of the watt meter type.

7. Apparatus as described in claim 4 wherein the mixing stage comprises a Hall generator.

8. Apparatus as described in claim 4 wherein the mixing stage comprises an induction motor.

9. Apparatus as described in claim 8 wherein the motor is of the polyphase type.

10. Apparatus as described in claim 8 wherein the motor is of the two-phase type.

11. Apparatus as described in claim 8 wherein the motor is of the Ferraris type, with means for feeding the two cycles respectively to control and exciter windings thereof subject to a 90 degree phase difference.

12. Apparatus as described in claim 4, for differential photometry as in automatic target seekers, including means for producing a pair of light fluxes; a single photoelectric transducer; and means for cyclically feeding the pair of light fluxes to the transducer for generating the periodic voltage signal.

13. Apparatus as described in claim 4, additionally including means for passing a pair of light streams through a pair of media; and means for thereupon generating the voltage signal from the pair of light streams.

14. Apparatus as described in claim 4, including a scale; means for deriving from said scale a pair of light streams representing the position of a scale marker; and means for generating the voltage cycle from the pair of light streams.

15. In apparatus for comparing two quantities, means for forming a periodic alternating signal having a plurality of maxima and minima in each overall cycle and reaching maximum values of fixed phase in each of two portions of the cycle corresponding to the respective quantities, a reference alternating voltage source of the frequency of the overall cycle, and means for multiplicatively mixing the signal and the reference voltage with the latter in phase with one of said portions and in phase opposition to the other of said portions, both portions of the signal having the same voltage and current paths in the mixing means.

16. In apparatus for comparing two light beams, a transducer, means for focussing both beams on the transducer, a cyclically operated shutter alternately cutting off the beams, each beam being fully cut off when there is any transmission of the other, so that the transducer forms a periodic alternating signal, a reference alternating voltage source of the frequency of the overall cycle of the shutter, and means for multiplicatively mixing the signal and the reference voltage, all portions of the signal having the same voltage and current paths in the mixing means.

17. In apparatus for indicating the position of an exterior light source, a beam-splitter producing two beams of equal intensity in one relative position of the light source and of unequal intensity in other relative positions of the light source, means for focussing the exterior light source on the beam splitter, a transducer, means for focussing both beams on the transducer, a cyclically operated shutter alternately cutting off the beams, each beam being cut off during the transmission of the other, so that the transducer forms a periodic signal, a reference alternating voltage source of the frequency of the overall cycle of the shutter, and means for multiplicatively mixing the signal and the reference voltage.

18. In apparatus for tracking a light source, a beam-splitter producing two adjacent approximately parallel beams of equal intensity in one relative position of the light source and of unequal intensity in other relative positions of the light source, a transducer, means for focussing both beams on the transducer, a cyclically operated shutter having a single opaque rotating element alternately modulating the beams through a cycle from cut-off to maximum and back to cut-off, each beam being cut off during, and before commencement of, the cycle of the other, so that the transducer forms a periodic alternating signal having a plurality of maxima and minima in each overall cycle and reaching a maximum value of fixed phase in each of two portions of the cycle, a reference alternating voltage source of the frequency of the overall cycle of the shutter, and means for multiplicatively mixing the signal and the reference voltage with the latter in phase with one of said portions and in phase opposition to the other of said portions, both portions of the signal having the same voltage and current paths in the mixing means, so that the average multiplied value of the product over the overall cycle is indicative of the magnitude and sign of the difference in intensities.

19. In apparatus for comparing two light beams, means for producing an electrical voltage signal having first and second halves of each fundamental cycle of the same general form and polarity but of amplitudes corresponding to the intensities of each of the respective beams, means for producing a reference alternating voltage of the same fundamental frequency as the signal, means for multiplicatively mixing the signal and the reference voltage, and means to detect the polarity and magnitude of the direct voltage component of the product thus produced.

20. The apparatus of claim 19 in which the reference voltage is free of even harmonics of the fundamental frequency.

21. The apparatus of claim 20 in which the reference voltage is in phase with one of the halves and in phase opposition to the other.

References Cited in the file of this patent

UNITED STATES PATENTS

| | | |
|---|---|---|
| 2,040,768 | Edwards | May 12, 1936 |
| 2,547,212 | Jamison et al. | Apr. 3, 1951 |
| 2,713,134 | Eckweiler | July 12, 1955 |
| 2,725,504 | Dunlap | Nov. 29, 1955 |
| 2,905,828 | O'Maley et al. | Sept. 22, 1959 |
| 2,946,942 | Peck | July 26, 1960 |
| 2,968,736 | Dobberstein | Jan. 17, 1961 |

OTHER REFERENCES

Mason et al.: "Hall Effect Modulators and 'Gyrators' Employing Magnetic Field Independent Orientations in Germanium," Journal of Applied Physics, vol. 24, No. 2, February 1953, pages 166–175, pages 166–169 cited.

Whitford et al.: "Photoelectric Guiding of Astronomical Telescopes," R. S. 1., March 1937, pages 78–82, pages 78–82 relied upon.